United States Patent
Kamiya et al.

(10) Patent No.: US 9,570,949 B2
(45) Date of Patent: Feb. 14, 2017

(54) ELECTRIC MOTOR WITH PERMANENT MAGNET HAVING CURVED OUTER WALL AND FLAT REAR WALL

(71) Applicant: AISIN SEIKI KABUSHIKI KAISHA, Kariya-shi (JP)

(72) Inventors: Naoki Kamiya, Anjo (JP); Takanori Koga, Anjo (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/474,940

(22) Filed: Sep. 2, 2014

(65) Prior Publication Data

US 2015/0061444 A1    Mar. 5, 2015

(30) Foreign Application Priority Data

Sep. 3, 2013 (JP) ................. 2013-182404

(51) Int. Cl.
*H02K 21/26* (2006.01)
*H02K 1/27* (2006.01)
*H02K 5/128* (2006.01)

(52) U.S. Cl.
CPC ............... *H02K 1/278* (2013.01); *H02K 5/128* (2013.01)

(58) Field of Classification Search
CPC .................................. H02K 1/27; H02K 21/14
USPC ............ 310/156.01, 156.17, 156.18, 156.21, 310/156.22, 156.28, 156.32, 156.53, 310/156.72
See application file for complete search history.

(56) References Cited

U.S. PATENT DOCUMENTS

| | | | | |
|---|---|---|---|---|
| 4,954,736 | A | * | 9/1990 | Kawamoto et al. ...... 310/156.21 |
| 5,250,255 | A | * | 10/1993 | Sagawa et al. ................. 419/39 |
| 6,025,665 | A | | 2/2000 | Poag et al. |
| 7,002,276 | B2 | * | 2/2006 | Evans .................... H02K 1/276 310/156.01 |
| 2002/0162939 | A1 | * | 11/2002 | Heidrich ............... H02K 1/278 248/683 |
| 2006/0017342 | A1 | * | 1/2006 | Park ......................... 310/156.19 |
| 2006/0049709 | A1 | * | 3/2006 | Noh .......................... 310/156.38 |
| 2009/0001838 | A1 | | 1/2009 | Okubo et al. |

(Continued)

FOREIGN PATENT DOCUMENTS

| | | |
|---|---|---|
| DE | 8427707 U1 | 1/1986 |
| DE | 102008023999 A1 * | 11/2009 ............. H02K 1/276 |

(Continued)

OTHER PUBLICATIONS

"Technologial trend of EPS system", Society of Automative Engineers of Japan (JSAE) Symposium, Feb. 15, 2013, pp. 12-15 (with partial English translation).

(Continued)

*Primary Examiner* — Jose Gonzalez Quinones
(74) *Attorney, Agent, or Firm* — Buchanan Ingersoll & Rooney PC (57) ABSTRACT

An electric motor includes: a ring-shaped stator including a field coil; and a rotor holding a permanent magnet in a magnet holding portion on an outer circumference thereof in an exposed state and being supported to be rotatable about a rotary shaft core in an inner space of the stator, wherein the magnet holding portion is configured to have a magnet insertion portion and a pair of regulation bodies, and the permanent magnet is configured to include a cylindrical outer wall surface, a rear wall surface, a pair of side wall surfaces, and a pair of engaged surfaces.

19 Claims, 7 Drawing Sheets

(56) References Cited

U.S. PATENT DOCUMENTS

2009/0015091 A1* 1/2009 Yang ..................... H02K 1/278
                                                    310/156.09

FOREIGN PATENT DOCUMENTS

| JP | 2001186698 A | * | 7/2001 |
|---|---|---|---|
| JP | 2004-328818 A | | 11/2004 |
| JP | 2009-044797 A | | 2/2009 |
| JP | 2009225607 A | * | 10/2009 |
| JP | 2010136514 A | * | 6/2010 |
| JP | 2012-257433 A | | 12/2012 |
| JP | 2013-021826 A | | 1/2013 |
| WO | 98/37618 A2 | | 8/1998 |

OTHER PUBLICATIONS

European Search Report issued on Jan. 23, 2015 by the European Patent Office, in corresponding European Patent Application No. 14183200.6 (7 pages).

Communication pursuant to Article 94(3) EPC dated Jul. 13, 2016 issued in the corresponding European Patent Application No. 14 183 200.6-1809 (6 pages).

* cited by examiner

ELECTRIC MOTOR WITH PERMANENT MAGNET HAVING CURVED OUTER WALL AND FLAT REAR WALL

CROSS REFERENCE TO RELATED APPLICATIONS

This application is based on and claims priority under 35 U.S.C. §119 to Japanese Patent Application 2013-182404, filed on Sep. 3, 2013, the entire contents of which are incorporated herein by reference.

TECHNICAL FIELD

This disclosure relates to an electric motor in which a permanent magnet is held by a rotor on an outer circumference thereof in an exposed state.

BACKGROUND DISCUSSION

JP 2013-21826A (Reference 1) discloses a technology in which a permanent magnet (a rotor magnet in the reference) is inserted into a magnet arrangement groove that is formed in a rotor yoke (a magnet back yoke in the reference) configuring a rotor, as an electric motor which is configured as described above. In the magnet arrangement groove, an overhang portion is formed to have a top portion width on an outer circumference side narrower than a bottom portion width on a rotary shaft core side. The permanent magnet is formed to have substantially the same cross-sectional shape as a space shape of the magnet arrangement groove.

In Reference 1, a shape of an outer side surface of the permanent magnet is formed to be a cylindrical surface shape which is in common with an outer circumferential surface of the rotor yoke. An outer surface thereof is exposed in a state where the permanent magnet is inserted into the magnet arrangement groove portion, and the overhang portion comes into contact with the permanent magnet, thereby hindering movement thereof when the rotor rotates. The permanent magnet is fixed to the magnet arrangement groove by using an adhesive.

JP 2009-44797A (Reference 2) discloses a technology in which a plurality of the permanent magnets (rotor magnets in the reference) are arranged on the outer circumference of the rotor yoke (a rotor core in the reference) in a circumferential direction and are fixed to the rotor yoke by using an adhesive, and cylindrical protection materials are arranged on the outer circumference of the permanent magnets.

JP 2012-257433A (Reference 3) discloses a technology in which even though the permanent magnet is not configured to be held by the rotor on the outer circumference thereof in an exposed state, the permanent magnets are arranged to be inserted into a plurality of accommodation holes which are formed at a predetermined interval in the circumferential direction in the vicinity of the outer circumference of the rotor yoke (a rotator in the reference) configuring the rotor.

In Reference 3, the outer side surface and a rear side surface of the permanent magnet are formed to be cylindrical surfaces having the rotary shaft core of the rotor as the center. Pole-to-pole step portions to be formed in portions of the rotor are arranged between the adjacent permanent magnets. Thus, a magnetic flux is directed toward a stator side without generating any closed magnetic flux at end portions of the permanent magnets. As a result, demagnetization durability is improved.

As disclosed in Reference 1, in a configuration in which an outer circumferential surface of a permanent magnet held by a rotor on an outer circumference thereof is formed to have a cylindrical surface shape equivalent to an outer circumferential surface of the rotor having a rotary shaft core as the center, the outer circumferential surface of the permanent magnet can approach an inner circumference of a stator. Thus, an action of a strong magnetic field realizes powerful rotations.

As disclosed in Reference 1, in a configuration in which a portion of the permanent magnet is caused to come into contact with a rotor yoke so as to be prevented from falling off, the permanent magnet can be reliably held in an appropriate position, compared to a case of fixing the permanent magnet by using an adhesive as disclosed in Reference 2.

However, as disclosed in Reference 1, when shapes of end surfaces of the permanent magnet are set so as to come into contact with an overhang portion of the rotor yoke, the end surfaces of the permanent magnets which are adjacent to each other in a circumferential direction become nonparallel. This configuration differs from that described in Reference 3. Thus, a magnetic flux extending outward from the end surfaces of the permanent magnet is closed, resulting in deterioration of demagnetization durability.

In the electric motor, filling a gap between the permanent magnet and the rotor yoke with a resin is also performed. However, as disclosed in Reference 3, when an epidermis portion is formed on the outer circumference of the rotor, it is assumed that the epidermis portion is outwardly deformed due to condensation pressure of the resin.

Particularly, in order to configure a powerful electric motor, a strong magnet which is made by including rare-earth elements such as samarium, neodymium, and dysprosium in the permanent magnet is used. However, the permanent magnet including the rare-earth elements is expensive, causing an increase in a manufacturing cost of the electric motor. Therefore, there is a demand of compactification of the permanent magnet to be used from a viewpoint of reducing the cost.

SUMMARY

Thus, a need exists for an electric motor which is not suspectable to the drawback mentioned above.

An aspect of this disclosure is directed to an electric motor including a ring-shaped stator that includes a field coil and a rotor that holds a permanent magnet in a magnet holding portion on an outer circumference thereof in an exposed state and is supported to be rotatable about a rotary shaft core in an inner space of the stator. The magnet holding portion is configured to have a magnet insertion portion which is more depressed in a rotary shaft core direction than an outer circumference of a rotor yoke configuring the rotor and a pair of regulation bodies which are integrally formed with the rotor yoke in a form of extending toward a central side in an opening width direction with respect to an opening portion formed in an outer circumferential position of the rotor yoke in the magnet insertion portion. The permanent magnet is configured to have a cylindrical outer wall surface whose radius is equivalent to that of the outer circumference of the rotor yoke, a rear wall surface which is a side opposite to the outer wall surface, a pair of side wall surfaces which are both end portions in a circumferential direction of the rotor yoke, and a pair of engaged surfaces which are formed by partially notching the outer wall surface so as to cause the regulation bodies to fit and abut thereon at both end positions on the outer wall surface in the circumferential direction.

According to this configuration, the regulation bodies formed in the rotor yoke come into contact on the engaged surfaces of the permanent magnet in a state where the permanent magnet is inserted into the magnet insertion portion, thereby preventing the permanent magnet from falling off. In other words, in this case, a portion of the permanent magnet is exposed to the outer circumference side of the rotor. Therefore, while being configured to support the permanent magnet in a manner similar to that of an IPM type (an embedded type) permanent magnet, a powerful motor can be configured by causing the outer wall surface of the permanent magnet to approach an inner surface of the stator like in an SPM type (an exposed type) permanent magnet.

Here, it is assumed that the permanent magnet is accommodated inside the rotor in a manner similar to the configuration described in Reference 3 and the outer circumference portion (an epidermis portion in Reference 3) of the permanent magnet with a relatively thin size is formed on an outer side of the permanent magnet in a comparative example. In contrast to the comparative example, according to a first aspect of this disclosure, no portion of the rotor yoke is present on the outer circumference side of the permanent magnet, and thus, the rotor yoke is simply configured and is easily manufactured. In a configuration of the comparative example, when a gap between the rotor yoke and the permanent magnet is filled with a resin, the outer circumference portion of the rotor may be deformed so as to outwardly expand due to condensation pressure. In contrast thereto, in the first aspect of this disclosure, since a portion of the permanent magnet is configured to be exposed from the outer circumference of the rotor yoke, even though a phenomenon in which a portion of the resin which fills the gap flows out to the outside from the gap between the rotor yoke and the permanent magnet is caused, manufacturing efficiency is improved without causing deformation of the rotor yoke.

Particularly, when the outer wall surface of the permanent magnet is molded in a cylindrical shape, for example, compared to a case of a plate-shaped permanent magnet, the thickness on the outer circumference side in the circumferential direction becomes thin in the cylindrical surface-shaped permanent magnet in which a thickness value of the plate-shaped permanent magnet is caused to match the maximum thickness value of the permanent magnet. Thus, the overall volume of the permanent magnet is reduced. Moreover, a portion of the outer wall surface of the permanent magnet is notched to form the pair of engaged surfaces, thereby making it possible to further reduce the volume of the permanent magnet in this disclosure.

Therefore, there is provided an electric motor configured to cause the rotor to reliably hold a compact permanent magnet on the outer circumference thereof and to have an excellent magnetic property. As the permanent magnet is efficiently utilized, the electric motor can be decreased in size as well.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
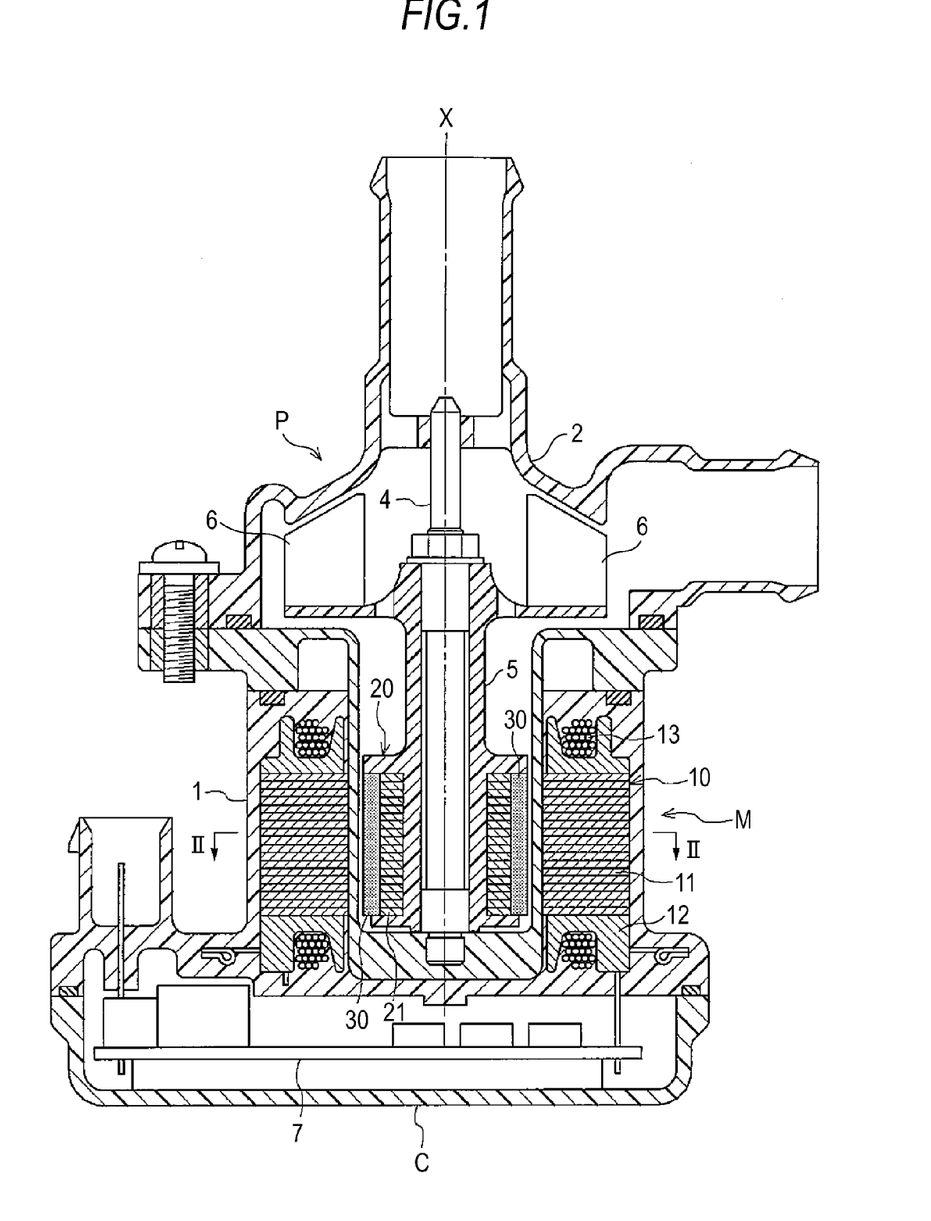
FIG. 1 is a cross-sectional view of a water pump.

Hereinafter, an embodiment disclosed here will be described with reference to the drawings.
Basic Configuration As illustrated in FIG. 1, a resin-made motor housing 1 that accommodates an electric motor M and a resin-made pump housing 2 that accommodates a pump P are connected to each other. The motor housing 1 is integrally formed with a control case C, thereby configuring a water pump.

One end portion of a support shaft 4 which is arranged to have the coaxial core as a rotary shaft core X is supported by the motor housing 1, and the other end portion thereof is supported by the pump housing 2. A resin-made rotary shaft 5 is rotatably supported by the support shaft 4 in a pullover state. The rotary shaft 5 includes a rotor 20 of the electric motor M on one end portion side thereof. A plurality of impellers 6 configuring the pump P are integrally formed inside the pump housing 2 on the other end portion side of the rotary shaft 5.

The electric motor M is configured to be a brushless DC motor, and rotations of the rotor 20 are controlled by a control element mounted on a control substrate 7 which is accommodated in the control case C.

The electric motor M according to the embodiment disclosed here can be used as a driving source of an oil hydraulic pump which supplies lubricant in a vehicle engine, in addition to the water pump. The electric motor M can also be used to open or close a vehicle window and can be used as a driving source of a steering wheel. The electric motor M may be used for other purposes in addition to vehicles. In an exemplary embodiment disclosed here, an example in which the electric motor M is configured to be the brushless DC motor is described. However, since the electric motor M having such a configuration is basically configured to be in common with a three-phase motor, the electric motor M may be configured to be the three-phase motor.

In the electric motor M according to the exemplary embodiment disclosed here, since water comes into contact with the rotor 20, there is a need for a waterproof configuration. However, for example, the exemplary embodiment may be applied to an electric motor M which is configured to have a sealed space where the rotor 20 is accommodated. In such a configuration, there is no need for waterproofing. In addition, there is no need for a waterproof structure for a stator 10 on an inner circumference side thereof, thereby making it possible to be decreased in size.

Electric Motor

Figure 2:
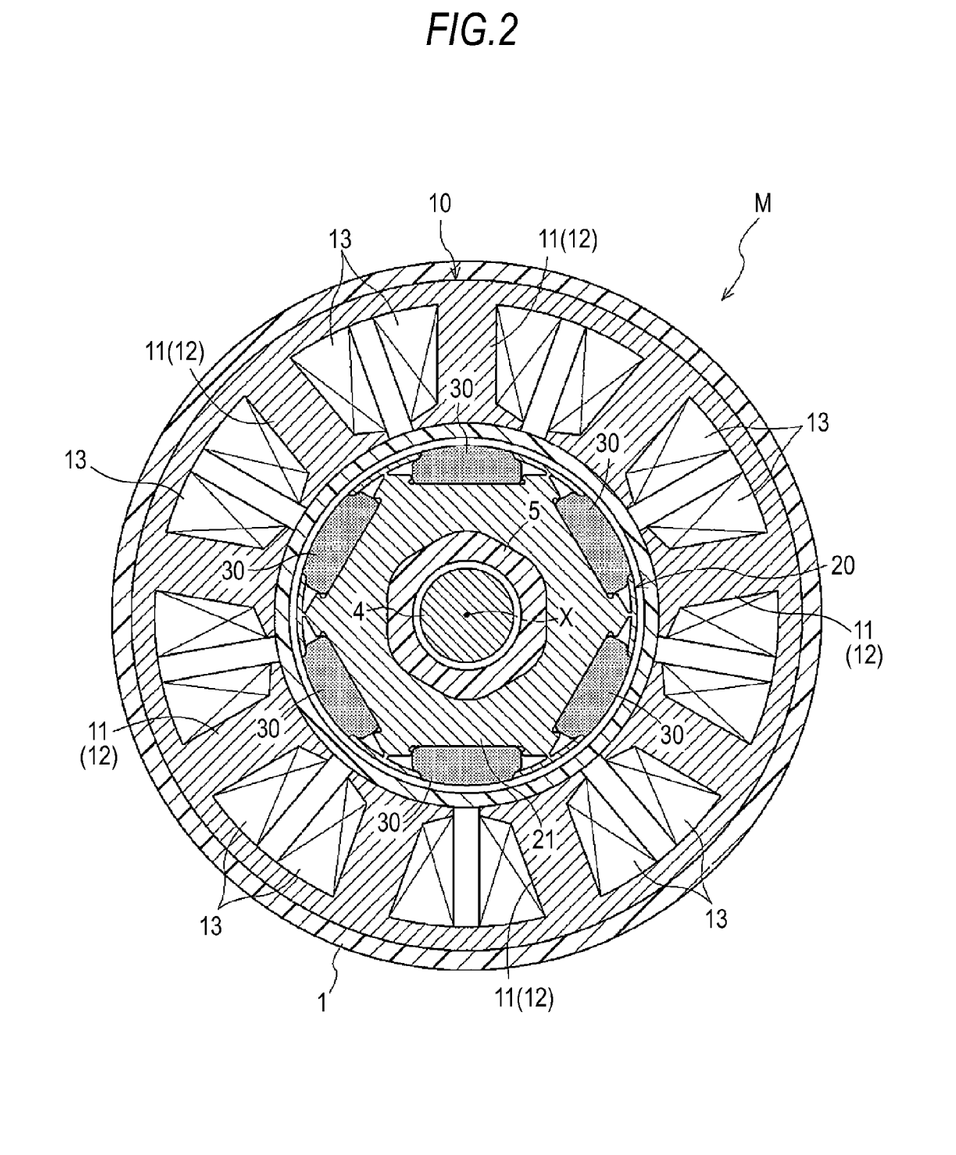
FIG. 2 is a cross-sectional view taken along line II-II of FIG. 1.

As illustrated in FIGS. 1 and 2, the electric motor M includes the ring-shaped stator 10 that is configured to have the rotary shaft core X as the center, and the rotor 20 that is supported to be rotatable about the rotary shaft core X inside the stator 10.

The stator 10 is configured to be layered with multiple electromagnetic steel sheets. The stator 10 is configured to be a nine-slot type stator in which a field coil 13 is wound around nine teeth portions 11 which are integrally formed with the stator 10, via insulators 12. The number of the teeth portions 11 is not limited to nine.

Electric Motor: Rotor

The rotor 20 includes a rotor yoke 21 that integrally rotates with the rotary shaft 5, and a plurality of the permanent magnets 30 that are supported by the rotor yoke 21 on an outer circumference, in a form of being partially exposed, thereby being configured to have a cylindrical shape in its entirety. FIG. 2 illustrates a six-pole type rotor yoke including six permanent magnets 30. However, the number of the permanent magnet 30 is not limited to six.

Figure 3:
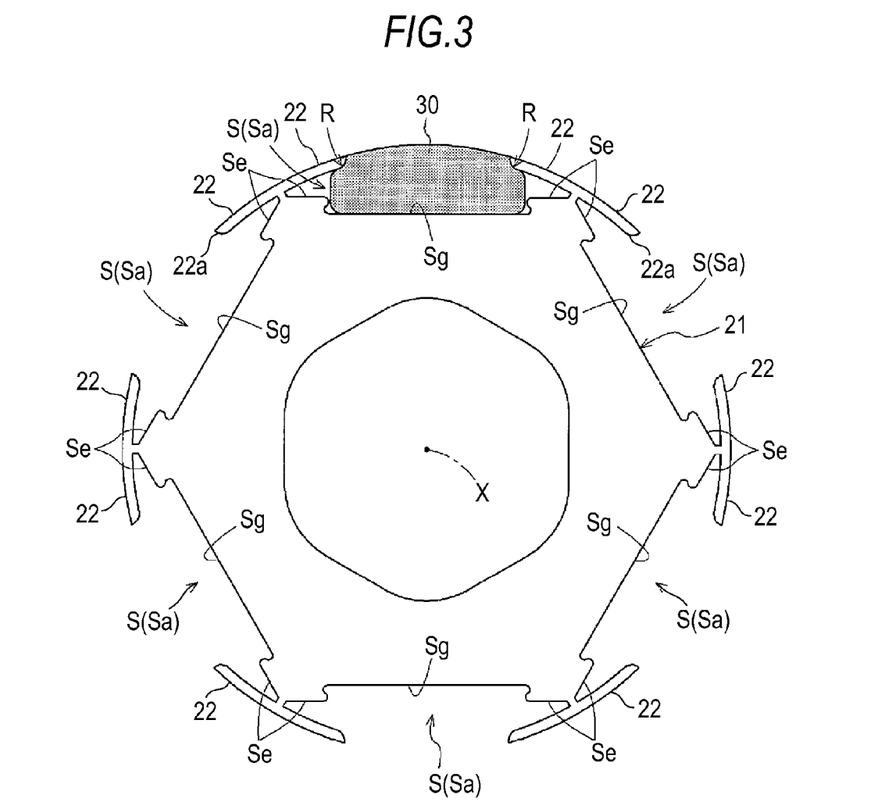
FIG. 3 is a cross-sectional view illustrating a rotor yoke and a permanent magnet.
Figure 4:
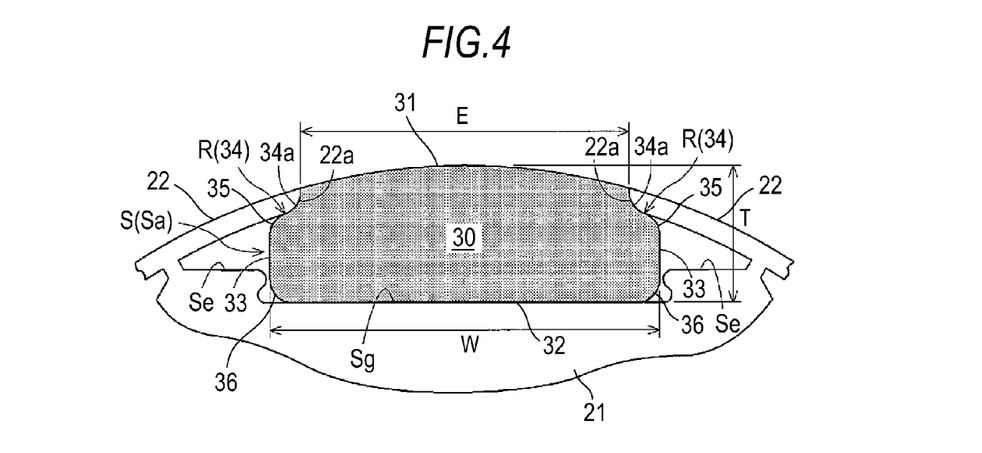
FIG. 4 is a cross-sectional view of the permanent magnet which is held in a magnet holding portion of the rotor yoke.

As illustrated in FIGS. 3 and 4, the rotor yoke 21 is configured to be layered with the multiple magnetic steel sheets which are formed to have the shapes illustrated in FIG. 3 by punching and the like. A plurality of magnet holding portions S holding the permanent magnet 30 are formed in the outer circumference portion of the rotor yoke 21.

Each of the magnet holding portions S is configured to include a magnet insertion portion Sa that is more depressed in a rotary shaft core direction than the outer circumference of the rotor yoke 21, and the pair of regulation bodies 22 that are integrally formed with the rotor yoke 21 in the form of extending toward the central side in the opening width direction with respect to the opening portion formed in the outer circumferential position of the rotor yoke 21 in the magnet insertion portion Sa.

In the magnet insertion portion Sa, a groove-shaped portion Sg having a width slightly wider than a magnet width W of the permanent magnet 30 so as to allow a bottom surface portion of the permanent magnet 30 to fit is formed, and expansion portions Se which expand further than the groove-shaped portion Sg in a circumferential direction on the outer circumference side are formed. The extending length (the length of an arm in the circumferential direction) of the regulation bodies 22 is expanded by forming the expansion portions Se.

A regulation arc surface 22a having an arc shape in the directional vision along the rotary shaft core X is formed at an extending end of the regulation body 22, a portion facing the rotary shaft core X.

In the rotor 20, caulking is performed in a direction of the rotary shaft core X in a state of overlapping the multiple magnetic steel sheets, thereby forming a dowel-shape portion between the multiple magnetic steel sheets. Accordingly, the rotor 20 is configured to maintain a relatively positional relationship of the multiple electromagnetic steel sheets and to prevent separation thereof. Since the front surface of the magnetic steel sheet is formed with an insulation film, an insulation adhesive may be used as the insulation film to be configured to maintain the positional relationship of the plurality of magnetic steel sheets.

Electric Motor: Permanent Magnet

As the permanent magnet 30, a powerful magnet including rare-earth elements such as samarium, neodymium, or dysprosium is used. The permanent magnet 30 is molded to have the shape illustrated in FIGS. 4 and 5. However, the permanent magnet 30 may be molded by cutting a magnetic material or may be molded using a die. When assembling the rotor 20, the permanent magnet 30 may be inserted into the magnet holding portion S. Otherwise, after inserting the magnetic material into the magnet holding portion S, magnetization may be performed on the material using a magnetization apparatus, thereby obtaining the permanent magnet 30. The following description includes a concept of performing the magnetization after inserting the material into the magnet holding portion S. However, the permanent magnet 30 is the target to be inserted into the magnet holding portion S.

Figure 5:
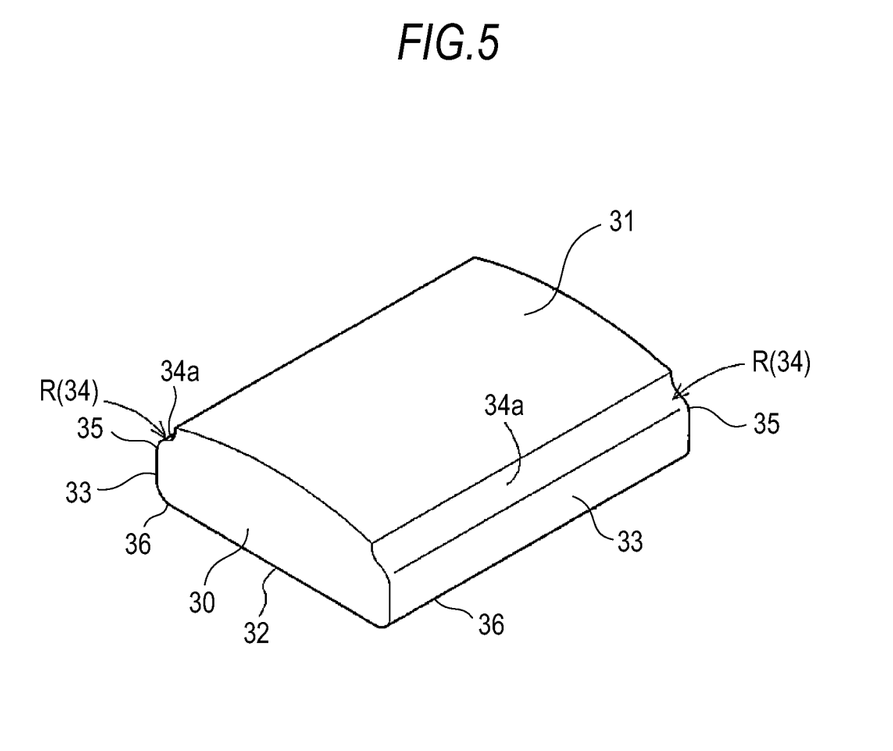
FIG. 5 is a perspective view of the permanent magnet.

The permanent magnet 30 includes a cylindrical outer wall surface 31 that has the radius equivalent to the outer circumference of the rotor yoke 21, a flat rear wall surface 32 that is the opposite side of the outer wall surface 31, a pair of side wall surfaces 33 that are at end portions in the circumferential direction (a width direction), and engaged portions R that are formed by partially notching the outer wall surface 31 so as to cause the regulation bodies 22 to fit at both the end positions on the outer wall surface 31 in the circumferential direction. In this manner, the permanent magnet 30 is formed to have the semicylindrical shape in its entirety.

In each of the engaged portion R, a pressed surface 34 with which the regulation arc surface 22a of the regulation body 22 comes into contact, an engaged arc surface 34a that is smoothly curved upward in a direction of the outer wall surface 31 from a portion close to the center of the permanent magnet 30 in the width direction, in the pressed surface 34 in the directional vision along the rotary shaft core X are formed. The radius of the engaged arc surface 34a is caused to be equivalent to the regulation arc surface 22a of the regulation body 22, thereby decreasing the gap therebetween.

In a border portion between the pressed surface 34 and the side wall surface 33, an outer side arc surface 35 (a specification example of the chamfering surface) having a smooth arc shape by performing chamfering in the directional vision along the rotary shaft core X is formed. In a border portion between the rear wall surface 32 and the side wall surface 33, a rear side arc surface 36 having a smooth arc shape by performing the chamfering in the directional vision along the rotary shaft core X is formed.

In the permanent magnet 30, a dimension in the circumferential direction (width direction) is referred to as the magnet width W, a dimension of the thickest portion between the outer wall surface 31 and the rear wall surface 32 is referred to as a magnet thickness T, and a dimension of an exposed portion in the width direction out of the outer wall surface 31 without being covered by the regulation body 22 is referred to as an exposed width E.

According to such a configuration, in a state where the permanent magnet 30 is held by being inserted into the magnet insertion portion Sa of the magnet holding portion S, a positional relationship in which the rear wall surface 32 of the permanent magnet 30 fits the groove-shaped portion Sg and the regulation body 22 comes into contact with the pressed surface 34 of the permanent magnet 30 at the same time is achieved. In such a state, the regulation body 22 is slightly and elastically deformed so as to cause a biasing force to be applied to the permanent magnet 30 by the regulation body 22, thereby causing the posture of the permanent magnet 30 to be stable.

As the outer wall surface 31 of the permanent magnet 30 is exposed in the exposed width E, the outer wall surface 31 of the permanent magnet 30 in the region of the exposed width E smoothly continues to the outer circumference of the rotor yoke 21. Therefore, rotational resistance can be reduced compared to a case of forming unevenness in the circumferential direction.

The outer wall surface 31 and the outer circumferential surface of the rotor yoke 21 are arranged at positions to be smoothly continued to each other. Since the length of the arm of the regulation body 22 is set long as described above, a necessary biasing force is obtained by elastically deforming the regulation body 22 in its entirety.

Since the side wall surface 33 of the permanent magnet 30 is relatively positioned in a posture to be substantially parallel to the adjacent side wall surface 33 of the permanent magnets 30, a magnetic flux which extends outward from the side wall surface 33 is in a state of being continued to the magnetic flux which extends from the adjacent side wall surface 33 of the permanent magnet 30. Accordingly, a disadvantage of deterioration in demagnetization durability is solved by causing the magnetic flux to be closed.

Performance of Permanent Magnet

Figure 6:
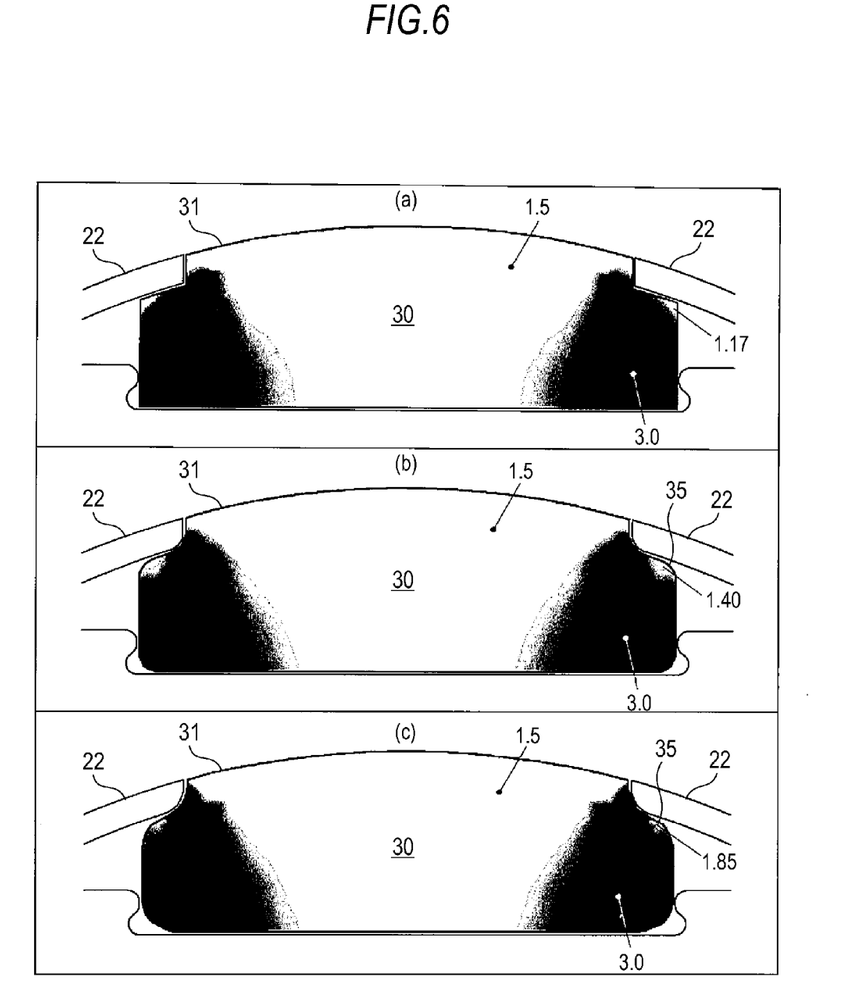
FIG. 6 is a view illustrating a relationship between a shape and a permeance coefficient of the permanent magnet.

Three types of trial products (a), (b), and (c) of the permanent magnets 30 are heated to the temperature at which the demagnetization starts, and distribution conditions of the permeance coefficients at each of the temperatures are illustrated in FIG. 6 through contour plotting.

In the trial product (a) in which the pressed surfaces 34 of the pair of engaged portions R are formed, the corner portion between the pressed surface 34 and the side wall surface 33 on the outer circumference side is sharply formed. In the trial product (b), the radius of the corner portion of the outer side arc surface 35 (the chamfering surface, the corner portion on the outer circumference side) which forms an arc shape between the pressed surface 34 and the side wall surface 33 is set to 0.5 mm. In the trial product (c), the radius of the outer side arc surface 35 which forms an arc shape between the pressed surface 34 and the side wall surface 33 is set to 1.0 mm.

FIG. 6 illustrates the permeance coefficients of the three types of the trial products (a), (b), and (c) at the temperature from which the demagnetization starts when the temperature increases. As illustrated, the permeance coefficient of a central portion of each trial product at the temperature from which the demagnetization starts is "1.5", and the permeance coefficients of both the side portions thereof are "3.0". When the demagnetization starts in this manner, the permeance coefficient of the corner portion of the permanent magnet 30 on the outer circumference side becomes the minimum value. The permeance coefficient of the corner portion on the outer circumference side of the trial product (a) is "1.17", the permeance coefficient of the outer side arc surface 35 (the chamfering surface, the corner portion on the outer circumference side) of the trial product (b) is "1.40", and the permeance coefficient of the outer side arc surface 35 (the corner portion on the outer circumference side) of the trial product (c) is "1.85". In other words, as the radius of the chamfering portion of the corner portion on the outer circumference of the permanent magnet 30 becomes greater, the permeance coefficient increases.

Figure 7:
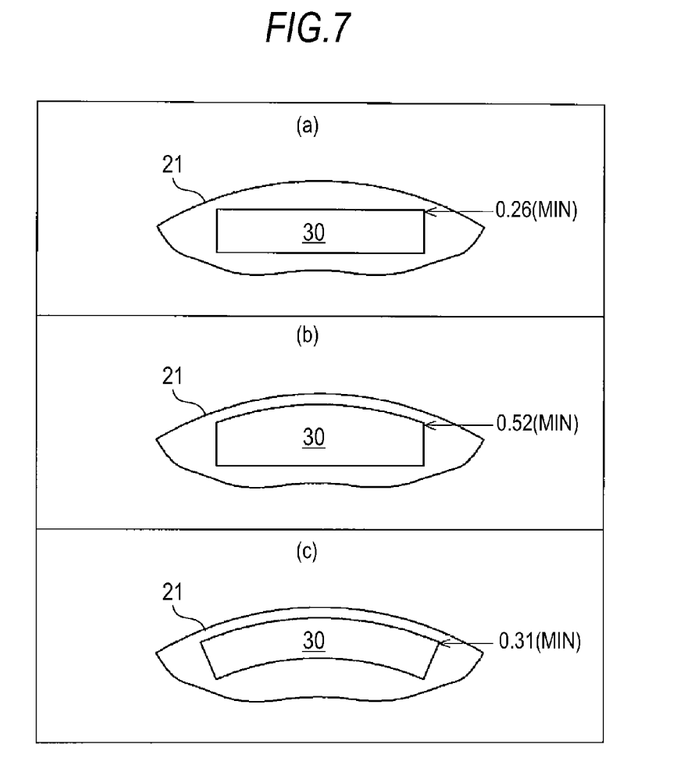
FIG. 7 is a view illustrating permeance coefficients of corner portions of the permanent magnets having a plurality of shapes included in one rotor.
Figure 8:
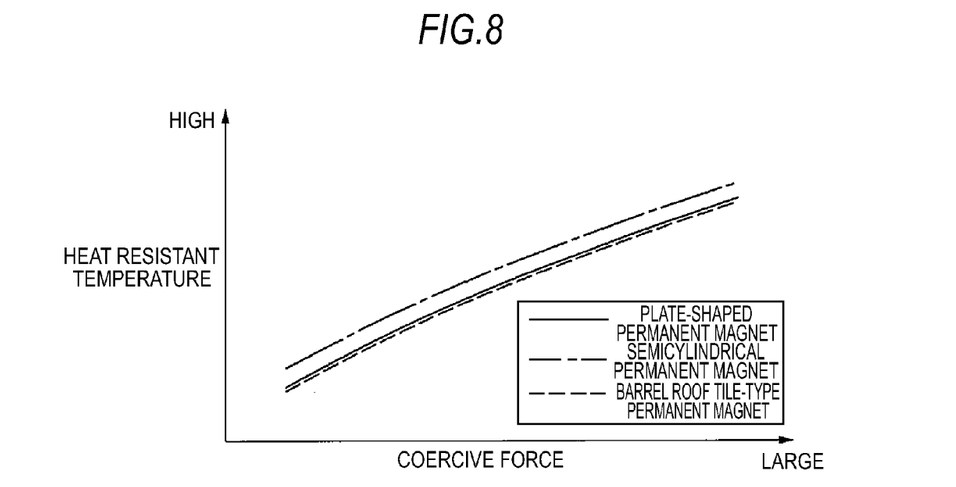
FIG. 8 is a graph illustrating heat resistant temperatures of the permanent magnets having the shapes illustrated in FIG. 7.

FIG. 7 illustrates an experimental configuration including the permanent magnets 30 having the three types of shapes such as, (a) the plate-shaped permanent magnet, (b) the semicylindrical permanent magnet, and (c) the barrel roof tile-type permanent magnet, with respect to one rotor 20. FIG. 8 illustrates a graph of a relationship between the coercive force and the heat resistant temperature in the experimental configuration of FIG. 7.

As illustrated in FIG. 8, the relationship between the heat resistant temperature and the coercive force varies due to the substantially similar property in all three types of the permanent magnet 30. However, the semicylindrical permanent magnet has the highest heat resistant temperature. As illustrated in FIG. 7, the permeance coefficients respectively become the minimum values in the corner portions of the permanent magnets 30 having the three types of shapes on the outer circumference side, and the values are as follows, (a) "0.26" in the plate-shaped permanent magnet, (b) "0.52" in the semicylindrical permanent magnet, and (c) "0.31" in the barrel roof tile-type permanent magnet.

Figure 9:
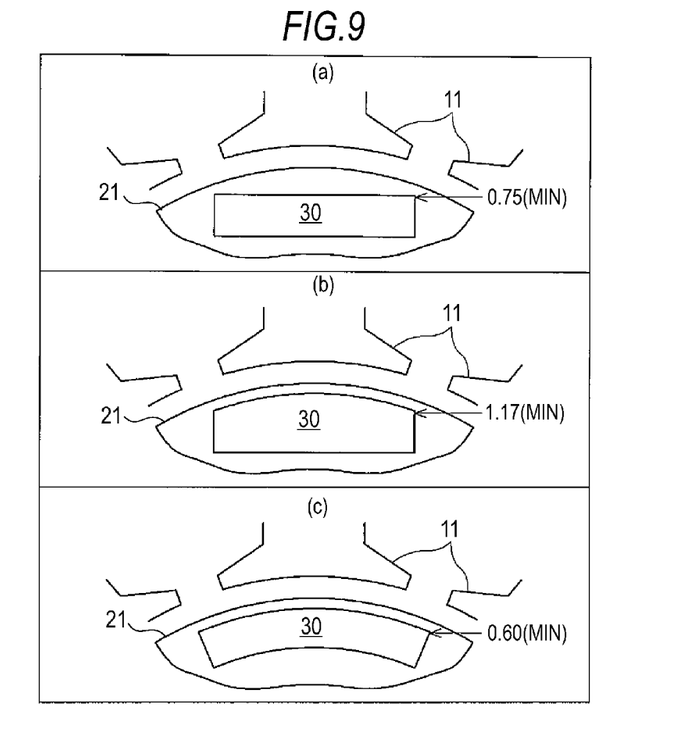
FIG. 9 is a view illustrating the permeance coefficients of the corner portions of the permanent magnets having the plurality of shapes included in the rotor in an inner space of a stator.
Figure 10:
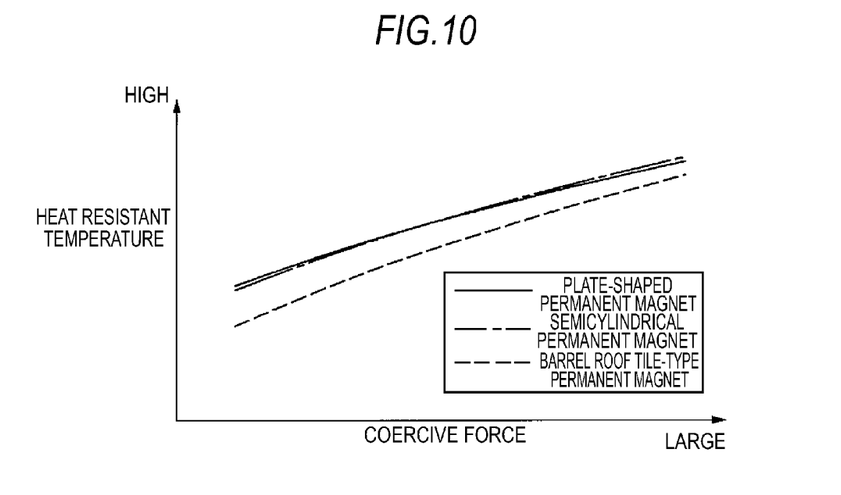
FIG. 10 is a graph illustrating the heat resistant temperatures of the permanent magnets having the shapes illustrated in FIG. 9.

FIG. 9 illustrates an experimental configuration including the permanent magnets 30 having the three types of shapes such as, (a) the plate-shaped permanent magnet, (b) the semicylindrical permanent magnet, and (c) the barrel roof tile-type permanent magnet, with respect to the rotor 20 which is arranged inside a space surrounded by teeth portions 11 of the stator 10. FIG. 10 illustrates a graph of a relationship between the coercive force and the heat resistant temperature in the experimental configuration of FIG. 9.

As illustrated in FIG. 10, the relationship between the coercive force and the heat resistant temperature varies due to the substantially fixed property in all three types of the permanent magnet 30. However, the semicylindrical permanent magnet has the highest heat resistant temperature. As illustrated in FIG. 9, the permeance coefficients respectively become the minimum values in the corner portions of the permanent magnets 30 having the three types of shapes such as, (a) "0.75" in the plate-shaped permanent magnet, (b) "1.17" in the semicylindrical permanent magnet, and (c) "0.60" in the barrel roof tile-type permanent magnet.

When determining from the graph illustrating the heat resistant temperature of the permanent magnets 30 having the three types of shapes, the semicylindrical permanent magnet has the highest heat resistant temperature. Regarding the heat resistant temperature, the permanent magnet 30 having the permeance coefficient which appears to be the minimum value in the corner portion of the permanent magnet 30 has the highest value.

Due to such a reason, it is estimated that the heat resistant temperature of the permanent magnet 30 becomes high when the permanent magnet has the semicylindrical shape as the trial product (c) of FIG. 6 and has a shape in which the permeance coefficient in the permanent magnet having the greatest radius of the corner portion on the outer circumference side becomes the greatest value. The heat resistant temperature of the electric motor M is increased by adopting the permanent magnet 30 having such a shape.

When assembling the rotor 20, the magnetic steel sheets are layered as described above, and the positions of the plurality of layered steel sheets are determined by performing the caulking. Then, in a state where the permanent magnet 30 is held in the magnet holding portion S, a resin is subjected to pressure injection into a gap between the permanent magnet 30 and the rotor yoke 21, thereby causing the permanent magnet 30 and the rotor yoke 21 to be integrated to each other by curing the resin, and exhibiting a waterproof property.

Operation and Effect of Exemplary Embodiment

In this manner, in the electric motor M according to the embodiment disclosed here, the permanent magnet 30 is supported in a manner similar to that of an IPM-type (an embedded type) permanent magnet with respect to the magnet holding portion S of the rotor 20. A powerful motor is configured by causing the outer wall surface of the permanent magnet 30 to approach an inner surface of the stator like in an SPM type (an exposed type) by exposing a portion of the permanent magnet 30 to the outer circumference side.

In the magnet holding portion S, the regulation body 22 of the rotor yoke 21 is caused to come into contact with the pressed surface 34 in the engaged portion R of the permanent magnet 30, thereby determining the position of the permanent magnet 30. The permanent magnet 30 is stably held by appropriately crimping the permanent magnet 30 utilizing the elastic deformation of the regulation body 22.

Since the side wall surface 33 of the permanent magnet 30 is relatively arranged in a posture to be substantially parallel to the adjacent side wall surface 33 of the permanent magnets 30, the magnetic fluxes extending outward from the adjacent side wall surfaces 33 are continued to each other, thereby improving the demagnetization durability.

Particularly, the corner portion formed between the pressed surface 34 and the side wall surface 33 of the permanent magnet 30 is molded to have an arc shape, thereby increasing the heat resistant temperature of the permanent magnet 30.

Compared to the plate-shaped permanent magnet 30 having the thickness same as the magnet thickness T, the overall volume thereof can be reduced by reducing the thickness of both the end portions in the circumferential direction. Moreover, the volume can be further reduced since the engaged portion R is formed to be partially notched so that materials necessary to manufacture the permanent magnet 30 can be reduced in weight without deteriorating the performance as the permanent magnet 30, leading to reduction in cost.

According to the configuration, even when a resin is subjected to the pressure injection into the gap between the rotor yoke 21 and the permanent magnet 30, the pressure of the resin can be leaked out from the gap between the extending ends of the regulation bodies 22 and the permanent magnet 30. Therefore, the regulation bodies 22 are not outwardly deformed by the injection pressure.

An embodiment disclosed here can be utilized in an electric motor in which a permanent magnet is supported by a rotor on an outer circumference thereof in a form of being partially exposed.

An aspect of this disclosure is directed to an electric motor including a ring-shaped stator that includes a field coil and a rotor that holds a permanent magnet in a magnet holding portion on an outer circumference thereof in an exposed state and is supported to be rotatable about a rotary shaft core in an inner space of the stator. The magnet holding portion is configured to have a magnet insertion portion which is more depressed in a rotary shaft core direction than an outer circumference of a rotor yoke configuring the rotor and a pair of regulation bodies which are integrally formed with the rotor yoke in a form of extending toward a central side in an opening width direction with respect to an opening portion formed in an outer circumferential position of the rotor yoke in the magnet insertion portion. The permanent magnet is configured to have a cylindrical outer wall surface whose radius is equivalent to that of the outer circumference of the rotor yoke, a rear wall surface which is a side opposite to the outer wall surface, a pair of side wall surfaces which are both end portions in a circumferential direction of the rotor yoke, and a pair of engaged surfaces which are formed by partially notching the outer wall surface so as to cause the regulation bodies to fit and abut thereon at both end positions on the outer wall surface in the circumferential direction.

According to this configuration, the regulation bodies formed in the rotor yoke come into contact on the engaged surfaces of the permanent magnet in a state where the permanent magnet is inserted into the magnet insertion portion, thereby preventing the permanent magnet from falling off. In other words, in this case, a portion of the permanent magnet is exposed to the outer circumference side of the rotor. Therefore, while being configured to support the permanent magnet in a manner similar to that of an IPM type (an embedded type) permanent magnet, a powerful motor can be configured by causing the outer wall surface of the permanent magnet to approach an inner surface of the stator like in an SPM type (an exposed type) permanent magnet.

Here, it is assumed that the permanent magnet is accommodated inside the rotor in a manner similar to the configuration described in Reference 3 and the outer circumference portion (an epidermis portion in Reference 3) of the permanent magnet with a relatively thin size is formed on an outer side of the permanent magnet in a comparative example. In contrast to the comparative example, according to a first aspect of this disclosure, no portion of the rotor yoke is present on the outer circumference side of the permanent magnet, and thus, the rotor yoke is simply configured and is easily manufactured. In a configuration of the comparative example, when a gap between the rotor yoke and the permanent magnet is filled with a resin, the outer circumference portion of the rotor may be deformed so as to outwardly expand due to condensation pressure. In contrast thereto, in the first aspect of this disclosure, since a portion of the permanent magnet is configured to be exposed from the outer circumference of the rotor yoke, even though a phenomenon in which a portion of the resin which fills the gap flows out to the outside from the gap between the rotor yoke and the permanent magnet is caused, manufacturing efficiency is improved without causing deformation of the rotor yoke.

Particularly, when the outer wall surface of the permanent magnet is molded in a cylindrical shape, for example, compared to a case of a plate-shaped permanent magnet, the thickness on the outer circumference side in the circumferential direction becomes thin in the cylindrical surface-shaped permanent magnet in which a thickness value of the plate-shaped permanent magnet is caused to match the maximum thickness value of the permanent magnet. Thus, the overall volume of the permanent magnet is reduced. Moreover, a portion of the outer wall surface of the permanent magnet is notched to form the pair of engaged surfaces, thereby making it possible to further reduce the volume of the permanent magnet in this disclosure.

Therefore, there is provided an electric motor configured to cause the rotor to reliably hold a compact permanent magnet on the outer circumference thereof and to have an excellent magnetic property. As the permanent magnet is efficiently utilized, the electric motor can be decreased in size as well.

In the aspect of this disclosure, the permanent magnet may include an arc-shaped chamfering surface portion which smoothly continues in a directional vision along the rotary shaft core in a border portion between the engaged surface and the side wall surface.

With respect to the rotor, for example, measurement of demagnetizing factors at the time of a temperature rise is performed for a configuration in which three types of permanent magnets 30 such as, (a) the plate-shaped permanent magnet, (b) a semicylindrical permanent magnet, and (c) a barrel roof tile-type permanent magnet are included in one rotor as illustrated in FIG. 7, and a configuration in which the permanent magnets 30 having the three types of shapes described above are included in the rotor inside the stator as illustrated in FIG. 9. Based on the measurement, relationships between heat resistant temperatures and the demagnetizing factors are indicated in graphs illustrated in FIGS. 8 and 10. As can be understood from the graphs, the semicylindrical permanent magnet among the permanent magnet 30 has a coercive force greater than those of other shapes. Naturally, as the heat resistant temperature becomes higher, a value of the coercive force becomes greater.

Regarding the permanent magnets 30 having the three types of shapes, a permeance coefficient is measured for a corner portion (a corner portion on the outer circumference side) in which the permeance coefficient is minimized. According to the measurement, in the permanent magnets 30 respectively having different shapes, the semicylindrical permanent magnet has a value of the permeance coefficient in the corner portion greater than the values of other shapes. In other words, the heat resistant temperature of the semicylindrical permanent magnet is higher than the permanent magnets having other shapes. Thus, it is estimated that the heat resistant temperature is proportional to the permeance coefficient in the corner portion of the permanent magnet on the outer circumference side.

As illustrated in FIG. 6, regarding the semicylindrical permanent magnet 30, the permeance coefficient is measured for the corner portion on the outer circumference side. From the measurement result, when the chamfering surface portion is formed in the corner portion of the permanent magnet on the outer circumference side, it is determined that as the radius of the chamfering surface becomes greater, the permeance coefficient increases. As described above, since the permeance coefficient of the corner portion of the permanent magnet 30 on the outer circumference side is directly proportional to the heat resistant temperature, it is estimated that the permanent magnet 30 in which the arc-shaped chamfering surface is formed in the corner portion on the outer circumference side thereof has the high heat resistant temperature. In this manner, the heat resistant temperature can be increased by setting the shape of the permanent magnet.

In the aspect of this disclosure, an exposed area of the outer wall surface on the outer circumference of the rotor yoke in the circumferential direction may be larger than exposed areas of the regulation bodies on the outer circumference of the rotor yoke in the circumferential direction.

According to this configuration, the electric motor having a more excellent magnetic property is configured by increasing the exposed area of the outer circumference of the rotor yoke on the outer wall surface in the circumferential direction. Since the permanent magnet is efficiently utilized, the electric motor can be further decreased in size.

In the aspect of this disclosure, the permanent magnet may be molded by using a die.

According to this configuration, the permanent magnet can be molded at a cost lower than being molded by cutting.

In the aspect of this disclosure, the rotor yoke may be configured to be layered with magnetic steel sheets, and a gap between the magnet insertion portion and the permanent magnet may be filled with a resin.

According to this configuration, the permanent magnet inserted into the magnet insertion portion can be held in a fixed state by filling the gap between the magnet insertion portion and the permanent magnet with a resin.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric motor comprising:
a ring-shaped stator that includes a field coil;
a permanent magnet;
a rotor holding the permanent magnet in a magnet holding portion of the rotor at an outer circumference of the rotor so that a cylindrical outer wall surface of the permanent magnet is exposed, the rotor being supported to be rotatable about a rotary shaft core in an inner space of the stator;
the magnet holding portion including a magnet insertion portion which is more depressed in a rotary shaft core direction than an outer circumference of a rotor yoke configuring the rotor and a pair of regulation bodies integrally formed with the rotor yoke and extending toward a central side in an opening width direction with respect to an opening portion formed in an outer circumferential position of the rotor yoke in the magnet insertion portion, the permanent magnet being positioned in the magnet insertion portion;
the cylindrical outer wall surface of the permanent magnet possessing a radius equivalent to that of the outer circumference of the rotor yoke, the permanent magnet also possessing a flat rear wall surface which is a side opposite to the outer wall surface, a pair of side wall surfaces which are both end portions in a circumferential direction of the rotor yoke, and a pair of engaged surfaces which are formed by partially notching the outer wall surface so as to cause the regulation bodies to fit and abut thereon at both end positions on the outer wall surface in the circumferential direction; and
the magnet insertion portion being a groove-shaped portion possessing a bottom surface that faces the rear wall surface of the permanent magnet, the bottom surface of the groove-shaped portion possessing a width in the circumferential direction as measured between opposite circumferential ends of the bottom surface of the groove-shaped portion, the magnet insertion portion also including expansion portions possessing a groove configuration extending circumferentially beyond the opposite circumferential ends of the bottom surface of the groove-shaped portion of the magnet insertion portion, the expansion portions which possess the groove configuration being devoid of any part of the permanent magnet so that the expansion portions are empty,
wherein a side of each expansion portion parallel to the rear wall surface is substantially coextensive with a respective one of the pair of regulation bodies.

2. The electric motor according to claim 1, wherein the permanent magnet includes an arc-shaped chamfering surface which continues in a directional vision along the rotary shaft core in a border portion between the engaged surface and the side wall surface.

3. The electric motor according to claim 1, wherein an exposed area of the outer wall surface on the outer circumference of the rotor yoke in the circumferential direction is larger than exposed areas of the regulation bodies on the outer circumference of the rotor yoke in the circumferential direction.

4. The electric motor according to claim 1, wherein the permanent magnet is molded by using a die.

5. The electric motor according to claim 1, wherein the rotor yoke is configured to be layered with magnetic steel sheets, and a gap between the magnet insertion portion and the permanent magnet is filled with a resin.

6. The electric motor according to claim 1, wherein the magnet insertion portion is a groove-shaped portion possessing a flat bottom surface, the flat rear wall surface of the permanent magnet facing the flat bottom surface of the groove-shaped portion of the magnet insertion portion.

7. The electric motor according to claim 1, wherein each of the engaged surfaces includes an arc-shaped concave surface that is curved in a direction toward the cylindrical outer wall surface of the permanent magnet.

8. The electric motor according to claim 7, wherein the permanent magnet further includes an arc-shaped convex surface that is curved between each side wall surface and one of the arc-shaped concave surfaces.

9. The electric motor according to claim 1, wherein each of the regulation bodies includes an end portion possessing an arc shape.

10. The electric motor according to claim 1, wherein each of the engaged surfaces includes an arc-shaped concave surface that is curved in a direction toward the cylindrical outer wall surface, and each of the regulation bodies includes an arc-shaped end portion, the arc-shaped end portion of each regulation body contacting one of the arc-shaped concave surfaces.

11. The electric motor according to claim 1, wherein each of the engaged surfaces of the permanent magnet extends along a longitudinal extent of the permanent magnet and is arc-shaped in transverse cross-section and curved toward the cylindrical outer wall surface of the permanent magnet.

12. The electric motor according to claim 11, wherein the two regulation bodies of each sheet are arc-shaped extending towards one another and possess an outer circumference forming the outer circumference of the rotor yoke, the radius of the cylindrical outer wall surface of the permanent magnet being equivalent to that of the outer circumference of the two regulation bodies of each sheet, the two regulation bodies of each sheet engaging one of the arc-shaped engaged surfaces of the permanent magnet.

13. An electric motor comprising:
a ring-shaped stator that includes a field coil;
a permanent magnet;
a rotor comprised of a rotor yoke and a permanent magnet, the rotor yoke comprising more than two axially stacked sheets which each include a magnet holding portion in which is held the permanent magnet so that the permanent magnet is held at an outer circumference of the rotor with a cylindrical outer wall surface of the permanent magnet exposed, the rotor being supported to be rotatable about a rotary shaft core in an inner space of the stator;
the magnet holding portion of each of said sheets including a magnet insertion portion which is more depressed in a rotary shaft core direction than an outer circumference of the rotor yoke and a pair of regulation bodies integrally formed with the rotor yoke and extending toward each other;
the cylindrical outer wall surface of the permanent magnet possessing a radius equivalent to that of the outer circumference of the rotor yoke, the permanent magnet also possessing a rear wall surface at a side of the permanent magnet opposite to the outer wall surface, a pair of side wall surfaces which are both end portions in a circumferential direction of the rotor yoke, and a pair of engaged surfaces each configured as a partial notch of the outer wall surface;
the regulation bodies of each of said sheets possessing a free end portion, the free end portion of each regulation body being fitted into and contacting one of the engaged surfaces of the permanent magnet such that each of the regulation bodies is elastically deformed and applies a biasing force to the permanent magnet that stabilizes the permanent magnet in the magnet insertion portion;
wherein the magnet insertion portion is a groove-shaped portion possessing a bottom surface, the bottom surface of the groove-shaped portion possessing a width in the circumferential direction as measured between opposite circumferential ends of the bottom surface of the groove-shaped portion, the magnet insertion portion also including expansion portions possessing a groove configuration extending circumferentially beyond the opposite circumferential ends of the bottom surface of the groove-shaped portion, and
wherein a side of each expansion portion parallel to the rear wall surface is substantially coextensive with a respective one of the pair of regulation bodies.

14. The electric motor according to claim 13, wherein each of the expansion portions possesses a tapering configuration so that the groove configuration of the expansion portion narrows in a direction away from the groove-shaped portion.

15. The electric motor according to claim 13, wherein each of the engaged surfaces of the permanent magnet extends along a longitudinal extent of the permanent magnet and is arc-shaped in transverse cross-section and curved toward the cylindrical outer wall surface of the permanent magnet.

16. The electric motor according to claim 15, wherein the two regulation bodies of each sheet are arc-shaped extending towards one another and possess an outer circumference forming the outer circumference of the rotor yoke, the radius of the cylindrical outer wall surface of the permanent magnet being equivalent to that of the outer circumference of the two regulation bodies of each sheet, the two regulation bodies of each sheet engaging one of the arc-shaped engaged surfaces of the permanent magnet.

17. An electric motor comprising:
a ring-shaped stator that includes a field coil;
a permanent magnet;
a rotor holding the permanent magnet in a magnet holding portion of the rotor at an outer circumference of the rotor so that a cylindrical outer wall surface of the permanent magnet is exposed, the rotor being supported to be rotatable about a rotary shaft core in an inner space of the stator;
the magnet holding portion including a magnet insertion portion which is more depressed in a rotary shaft core direction than an outer circumference of a rotor yoke configuring the rotor and a pair of regulation bodies integrally formed with the rotor yoke and extending toward a central side in an opening width direction with respect to an opening portion formed in an outer circumferential position of the rotor yoke in the magnet insertion portion, the permanent magnet being positioned in the magnet insertion portion;

the cylindrical outer wall surface of the permanent magnet possessing a radius equivalent to that of the outer circumference of the rotor yoke, the permanent magnet also possessing a rear wall surface which is a side opposite to the outer wall surface, a pair of side wall surfaces which are both end portions in a circumferential direction of the rotor yoke, and a pair of engaged surfaces which are formed by partially notching the outer wall surface so as to cause the regulation bodies to fit and abut thereon at both end positions on the outer wall surface in the circumferential direction; and the magnet insertion portion being a groove-shaped portion possessing a bottom surface that faces the rear wall surface of the permanent magnet, the bottom surface of the groove-shaped portion possessing a width in the circumferential direction as measured between opposite circumferential ends of the bottom surface of the groove-shaped portion, the magnet insertion portion also including expansion portions possessing a groove configuration extending circumferentially beyond the opposite circumferential ends of the bottom surface of the groove-shaped portion of the magnet insertion portion, each of the regulating bodies overlying one of the expansion portions, wherein a side of each expansion portion parallel to the rear wall surface is substantially coextensive with a respective one of the pair of regulation bodies.

18. The electric motor according to claim 17, wherein each of the engaged surfaces of the permanent magnet extends along a longitudinal extent of the permanent magnet and is arc-shaped in transverse cross-section and curved toward the cylindrical outer wall surface of the permanent magnet.

19. The electric motor according to claim 18, wherein the two regulation bodies of each sheet are arc-shaped extending towards one another and possess an outer circumference forming the outer circumference of the rotor yoke, the radius of the cylindrical outer wall surface of the permanent magnet being equivalent to that of the outer circumference of the two regulation bodies of each sheet, the two regulation bodies of each sheet engaging one of the arc-shaped engaged surfaces of the permanent magnet.

* * * * *